United States Patent [19]

Chi

[11] Patent Number: 4,470,081

[45] Date of Patent: Sep. 4, 1984

[54] CONTROLLED RETURN TO A.C. DIGITAL MAGNETIC AND REPRODUCING SYSTEM

[75] Inventor: Chao S. Chi, Shrewsbury, Mass.

[73] Assignee: Sperry Corporation, New York, N.Y.

[21] Appl. No.: 339,352

[22] Filed: Jan. 15, 1982

[51] Int. Cl.$^3$ ............................ G11B 5/09; G11B 5/47
[52] U.S. Cl. .......................................... 360/43; 360/66
[58] Field of Search ............................. 360/40, 43, 66

[56] References Cited

U.S. PATENT DOCUMENTS 2,894,796  7/1959  Reynolds ............................. 360/66
4,190,868  2/1980  Moulin ..................................... 360/1

*Primary Examiner*—Vincent P. Canney

*Attorney, Agent, or Firm*—Howard P. Terry; Albert B. Cooper

[57] ABSTRACT

The Controlled Return to A.C. (CRA) magnetic recording and reproducing system applies a high frequency erase signal continuously to the write head except at the detents. At the detents polarity controlled interruptions of the high frequency erase signal are embedded therein. A positive interruption, a negative interruption and the absence of an interruption provides a ternary recording capability at the detent. The high frequency erase signal is controlled in phase to provide polarity coherent interruptions. A CRA cell includes two controlled interruptions providing a mapping of three binary digits into two CRA digits. The controlled interruption results in an opposite polarity pulse pair upon readback.

11 Claims, 17 Drawing Figures

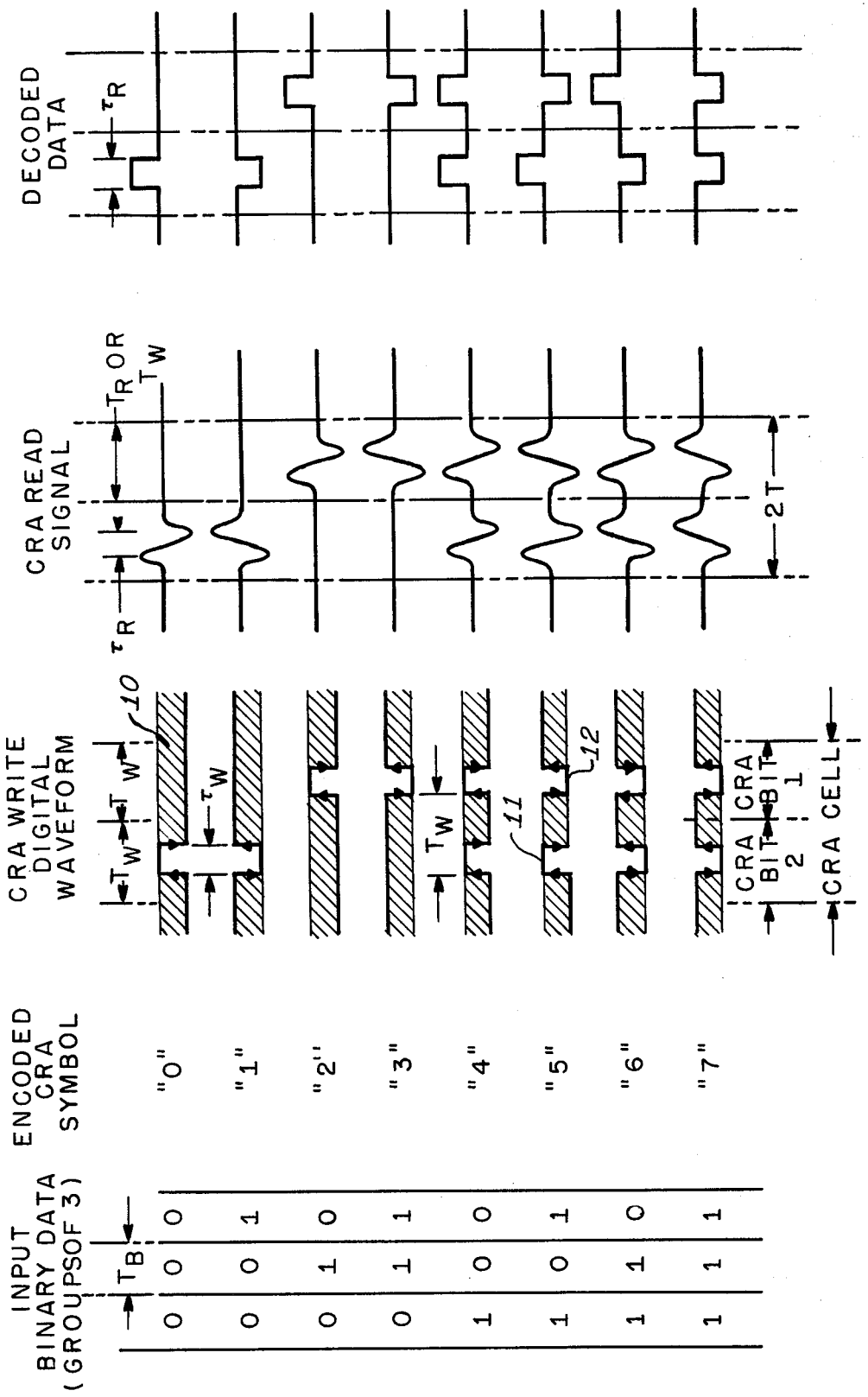

| BINARY D2 D1 D0 | Bb | Ba | BREAK SELECT | pb | pa | POLARITY SELECT |
|---|---|---|---|---|---|---|
| 0 0 0 | 1 | 0 | B2 | 1 | X | $\overline{p3}$ |
| 0 0 1 | 1 | 0 | B2 | 0 | X | p3 |
| 0 1 0 | 0 | 1 | B1 | X | 1 | $\overline{p3}$ |
| 0 1 1 | 0 | 1 | B1 | X | 0 | p3 |
| 1 0 0 | 1 | 1 | B3 | 1 | 1 | $\overline{p3}$ |
| 1 0 1 | 1 | 1 | B3 | 1 | 0 | p1 |
| 1 1 0 | 1 | 1 | B3 | 0 | 1 | p2 |
| 1 1 1 | 1 | 1 | B3 | 0 | 0 | p3 |

X = DON'T CARE

FIG. 4.

|  | b | a |  |
|---|---|---|---|
| B1 | 0 0 0 | 1 1 1 | GATE FIRST BREAK |
| B2 | 1 1 1 | 0 0 0 | GATE SECOND BREAK |
| B3 | 1 1 1 | 1 1 1 | GATE BOTH BREAKS |
| P1 | 1 1 1 | 0 0 0 | INVERT FIRST POLARITY |
| P2 | 0 0 0 | 1 1 1 | INVERT SECOND POLARITY |
| P3 | 0 0 0 | 0 0 0 | INVERT BOTH POLARIES |

FIG. 5.

| POLARITY CHANGE DET. | | BINARY INPUT BITS | | | | | |
|---|---|---|---|---|---|---|---|
| $S_2$ | $S_1$ | $D_5$ | $D_4$ | $D_3$ | $D_2$ | $D_1$ | $D_0$ |
| 1 | 1 | 0 | 0 | 0 | 1 | 0 | 0 |
|   |   | 0 | 1 | 0 | 1 | 0 | 0 |
|   |   | 1 | 0 | 0 | 1 | 0 | 0 |
|   |   | 1 | 1 | 0 | 1 | 0 | 0 |
|   |   | 0 | 0 | 1 | 1 | 1 | 1 |
|   |   | 0 | 1 | 1 | 1 | 1 | 1 |
|   |   | 1 | 0 | 1 | 1 | 1 | 1 |
|   |   | 1 | 1 | 1 | 1 | 1 | 1 |
| 1 | 0 | 0 | 0 | 0 | 0 | 0 | 0 |
|   |   | 0 | 1 | 0 | 0 | 0 | 0 |
|   |   | 1 | 0 | 0 | 0 | 0 | 0 |
|   |   | 1 | 1 | 0 | 0 | 0 | 0 |
|   |   | 0 | 0 | 0 | 1 | 0 | 1 |
|   |   | 0 | 1 | 0 | 1 | 0 | 1 |
|   |   | 1 | 0 | 0 | 1 | 0 | 1 |
|   |   | 1 | 1 | 0 | 1 | 0 | 1 |
|   |   | 0 | 0 | 1 | 0 | 0 | 1 |
|   |   | 0 | 1 | 1 | 0 | 0 | 1 |
|   |   | 1 | 0 | 1 | 0 | 0 | 1 |
|   |   | 1 | 1 | 1 | 0 | 0 | 1 |
|   |   | 0 | 0 | 1 | 1 | 1 | 0 |
|   |   | 0 | 1 | 1 | 1 | 1 | 0 |
|   |   | 1 | 0 | 1 | 1 | 1 | 0 |
|   |   | 1 | 1 | 1 | 1 | 1 | 0 |
| 0 | 1 | 0 | 0 | 0 | 0 | 1 | 0 |
|   |   | 0 | 1 | 0 | 0 | 1 | 0 |
|   |   | 1 | 0 | 0 | 0 | 1 | 0 |
|   |   | 1 | 1 | 0 | 0 | 1 | 0 |
|   |   | 0 | 0 | 1 | 0 | 1 | 1 |
|   |   | 0 | 1 | 1 | 0 | 1 | 1 |
|   |   | 1 | 0 | 1 | 0 | 1 | 1 |
|   |   | 1 | 1 | 1 | 0 | 1 | 1 |
|   |   | 0 | 0 | 1 | 1 | 0 | 0 |
|   |   | 0 | 1 | 1 | 1 | 0 | 0 |
|   |   | 1 | 0 | 1 | 1 | 0 | 0 |
|   |   | 1 | 1 | 1 | 1 | 0 | 0 |
|   |   | 0 | 0 | 0 | 1 | 1 | 1 |
|   |   | 0 | 1 | 0 | 1 | 1 | 1 |
|   |   | 1 | 0 | 0 | 1 | 1 | 1 |
|   |   | 1 | 1 | 0 | 1 | 1 | 1 |
| 0 | 0 | ALL REMAINING 6 BIT COMBINATIONS | | | | | |

FIG. 6.

DATA RECOVERY CONVERSION TABLE

| $B_b$ | $P_b$ | $B_a$ | $P_a$ | $D_2$ | $D_1$ | $D_0$ |
|---|---|---|---|---|---|---|
| 1 | 1 | 0 | * | 0 | 0 | 0 |
| 1 | 0 | 0 | * | 0 | 0 | 1 |
| 0 | * | 1 | 1 | 0 | 1 | 0 |
| 0 | * | 1 | 0 | 0 | 1 | 1 |
| 1 | 1 | 1 | 1 | 1 | 0 | 0 |
| 1 | 1 | 1 | 0 | 1 | 0 | 1 |
| 1 | 0 | 1 | 1 | 1 | 1 | 0 |
| 1 | 0 | 1 | 0 | 1 | 1 | 1 |

* -DON'T CARE CONDITIONS

CONTROLLED RETURN TO A.C. DIGITAL MAGNETIC AND REPRODUCING SYSTEM

BACKGROUND OF THE INVENTION

1. Field of the Invention

The present invention relates primarily to digital magnetic recording systems. The invention may be considered as a system that converts binary data into ternary data and records the ternary data on a magnetic medium. The ternary data read from the medium is converted back into the corresponding binary format. The concepts of the present invention may also be utilized in digital communication systems.

2. Description of the Prior Art

Present day digital magnetic recording systems typically record binary data by utilizing binary valued write current waveforms. For example, in the conventional return-to-zero (RZ) and non-to-return-to-zero (NRZ) formats each cell of the medium is magnetized either in the positive direction or the negative direction to represent the two binary data states. In a modified NRZ format (NRZI) a transition from the existing polarity of magnetization to the opposite polarity of magnetization is recorded for a binary ONE and no transition is recorded for a binary ZERO.

It is a desideratum of the magnetic recording art to increase the information density stored on the medium by, inter alia, packing the magnetic flux transitions as closely as possible on the medium. Depending on the configuration of the magnetic interface, non-linear distortions and intersymbol interference degrade data recovery reliability because of such factors as pattern dependent amplitude attenuation, which effects bit resolution, and timing displacement anomolies such as peak shift. Conventionally complex and hence expensive signal processing channels are provided to enhance data recovery reliability in such systems utilizing high bit packing density of the medium.

Another technique utilized to increase the storage efficiency of the medium is to encode the binary data by various run-length-limited codes. Although providing significant improvements in recording density efficiency, systems utilizing such codes are nevertheless restricted by the basic limitations of the interface.

It should be noted that only the position of the transition, but the polarity of the transition, has been commonly used to convey information in the present day saturated digital magnetic recording systems.

Another basic requirement in digital magnetic recording systems is overwrite of old data. When new data is recorded in prior art saturated magnetic recording systems, saturation current must be utilized to effectively erase the old data. In accordance with the parameters of the magnetic interface, the saturation current required may be excessive for undistorted recording of the new data. This results in an inhomogeneously erased medium on which the new data is recorded resulting in degraded surface noise and SNR. In the present invention the high frequency erase signal effectively erases the medium without the requirement of excessive current which in the prior art caused the degradation in data.

Additionally, in conventional prior art saturated recording utilizing, for example, run length limited codes, the frequency spectrum of the recorded information contains both low and high frequency components. As is known, the low frequency components require high overwrite current which has a tendency to distort the new data. In the present invention the write information contains no low frequency components. Therefore, the CRA waveform comprising high frequency dither and CRA breaks, which are themselves high frequency waveforms, can effectively erase the old data, without excessive current which in prior systems distorted the data.

It is generally known that the information density of magnetic recording systems may be enhanced by providing higher order recording than binary. For example, the NRZ and RZ formats may be enhanced by utilizing the zero write current state as an information bearing condition in conjunction with positive and negative magnetization. Such a ternary system will not provide the necessary function of overwrite of old data when new data is recorded. A separate erase cycle may be utilized to obviate the problem but this is generally considered unacceptable in high speed present day digital magnetic recording systems.

SUMMARY OF THE INVENTION

The above discussed disadvantages of the prior art are overcome by the present invention by utilizing a continuous high frequency alternating current erasure signal as the write current except at the data cells of the medium whereat a polarity controlled interruption of the erasure signal is embedded to convey ternary information. The interruption may be considered as a break or a pulse. A positive break is generated by interrupting the erase signal on a positive going edge thereof and resuming the erase signal at a negative going edge, the interval during the interruption or break having a positive saturation current provided to the write head. Conversely a negative break is embedded by interrupting the a.c. signal on a negative going edge thereof and resuming the a.c. signal on a positive going edge. During the interruption or break, negative saturation current is applied to the write head. A third state is defined at a data cell of the medium by maintaining the high frequency erasure signal thereat and not embedding a break. The freedom of break polarity is thereby realized to convey additional information.

In a preferred embodiment of the invention groups of three binary input digits are mapped into two CRA digits which comprise a CRA cell. Preferably the eight combinations of three binary digits are mapped into eight distinct combinations of one or two positive or negative CRA breaks. The mapping is selected such that each CRA cell comprising two CRA bits has at least one controlled interruption therein. The combination of no pulse within a CRA cell is discarded to provide effective self-timing for data recovery. The phase of the a.c. erasure signal is controlled to provide coherent polarity at the leading and trailing edges of the interruptions (or the breaks).

The high frequency erasure signal demagnetizes the medium, thus efficaciously erasing old data and providing a homogeneously erased medium which results in minimum surface noise.

The playback signal of a CRA recorded interruption is a pair of pulses or a doublet having opposite polarity with respect to each other, the leading and trailing polarities depending upon the polarity of the encoded CRA interruption. The high frequency erasure signal results in a zero level d.c. signal on readback. The a.c. erasure signal provides freedom of directionality in recording positive or negative CRA bits in accordance with the input data. The continuous high frequency erasure with the embedded breaks tend to minimize interference between adjacent recorded CRA bits as well as to minimize track to track crosstalk thus overcoming the peak shift and amplitude attenuation problems attendant prior art high density digital magnetic recording systems.

BRIEF DESCRIPTION OF THE DRAWINGS

FIG. 2 is a diagram illustrating the mapping of binary digits into CRA write waveform digits and the read waveforms resulting therefrom.

FIG. 4 is a logic table illustrating the logic implemented by the binary to break select and the binary to polarity select blocks of FIG. 3.

FIG. 5 is a waveform diagram illustrating the break select and polarity select waveforms generated in the operation of FIG. 3.

FIG. 6 is a logic table illustrating the logic implemented by the binary-to-polarity change detect block of FIG. 3.

DESCRIPTION OF THE PREFERRED EMBODIMENT

Figure 1:
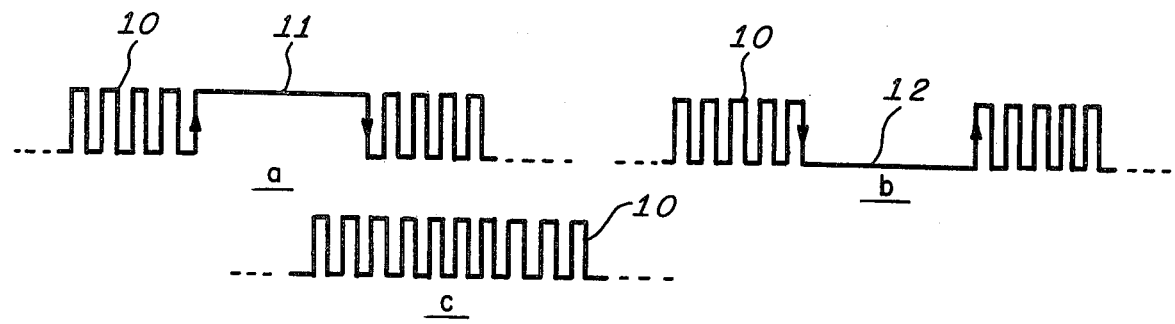
FIG. 1 is a waveform diagram of the three possible CRA bit conditions embedded in the a.c. erasure signal.

Referring to FIG. 1, waveforms illustrating the underlying concept of the present invention are illustrated. A constant and continuous high frequency a.c. erasure signal, denoted by reference numeral 10, is applied to the write head except at the information bearing locations or detents of the medium. At the detents, the a.c. erasure signal is interrupted for a time interval to form a break having the effect of recording a break or doublet in readback on the medium. Ternary information may be recorded via a positive-going break, a negative-going break or the absence of a break. In order to generate a positive break, the erasure signal is interrupted following a rising edge thereof and resumed at a falling edge thereof. A positive break is denoted by reference numeral 11. A negative break is generated by interrupting the a.c. erasure signal after a negative-going edge thereof and resuming the a.c. signal on a positive-going edge thereof. A negative CRA break is denoted by reference numeral 12. The absence of a break is illustrated by FIG. 1C. The a.c. erasure signal demagnetizes the medium to provide a homogeneously erased medium resulting in minimum surface noise and improved signal-to-noise ratio. The a.c. signal additionally confines the recorded pulse to the detent minimizing bit spreading and intersymbol interference with the reduction in the concomitant deleterious effects of peak shift and pattern dependent amplitude attenuation.

In the preferred embodiment of the invention, the CRA breaks are constrained to occur coherently at regularly occurring detents on the medium. The leading edges and trailing edges of the breaks occur synchronously with respect to the system write clock. In order to attain freedom of recording directionality the a.c. erasure signal is shifted in phase in a manner to be described so that freely chosen and positive and negative break edges occur in synchronism with the system clock. This avoids the need of using very high frequency to achieve effective erasure as well as to maintain accurate break width. The CRA breaks convey both position and polarity information. The freedom of recording directionality attained by the present invention therefore conveys additional information with respect to prior art systems with a concomitant increase in recorded data density.

The readback signal, utilizing an inductive read head, of a CRA break is a pair of pulses having opposite polarities with respect to each other. The read back signal of a positive break is a positive pulse followed by a negative pulse. The read back signal of a negative break is a negative pulse followed by a positive pulse. The information bearing condition of the absence of a pulse is a zero level signal. The peak-to-peak amplitude and peak spacing are a function of the width of the CRA break. Because of the close proximity of the two transitions of the CRA break, the pulse pair is strongly interactive resulting in a well behaved and predictable read back signal in both amplitude and timing and with zero d.c. component. The narrow spacing between the flux transitions of the CRA doublet result in substantial immunity with respect to external coupling. The external field interference from the closely coupled pulse pair, which is similar to a dipole, is reduced because of self-cancellation. The distance between CRA breaks should be such as to provide negligible pulse pair to pulse pair interaction. The a.c. erasure signal provides efficient overwrite of old data resulting in an improved signal-to-noise ratio. The pattern independent constant amplitude and self-timing in read back results in signal stability and reliable data recovery.

Thus, each CRA break results in a pair of strongly interactive pulses or a doublet of similar amplitude going from positive to negative or from negative to positive. These two polarity combinations and the absence of a doublet constitutes the read signal. The well behaved read back pulse pairs and timing accuracy of the peak positions permit signal recovery circuits of an extremely predictive and robust character.

In a preferred embodiment of the invention, groups of three input binary digits, for example in NRZ format, are mapped into two directional CRA bits, each CRA bit being conveyed as a positive or negative break or as the absence of a break. FIG. 2 illustrates a preferred mapping of binary to full directionality CRA. The eight combinations of three binary input digits are delineated with the corresponding CRA symbol adjacent thereto. It is appreciated that the correspondence between the CRA symbols and the bit patterns of the input binary data is arbitrary.

The CRA write digital waveforms illustrated adjacent the CRA symbols depict the preferred mapping from NRZ binary to CRA code. Each group of two CRA bits comprise a CRA cell. For convenience, the right most CRA bit is considered to have occurred before the left most CRA bit. It is appreciated that since each CRA bit can be positive, negative or absent, there are nine possible CRA break patterns for each CRA cell. The combination of both breaks absent is discarded providing eight remaining possible CRA encodings wherein there is always at least one CRA pulse in a CRA cell. This encoding results in extremely stable self-timing recovery apparatus. In a manner similar to that denoted above with respect to FIG. 1, the high frequency a.c. erasure signal, a positive CRA break and a negative CRA break are denoted by reference numerals 10, 11 and 12, respectively.

As illustrated in FIG. 2, the spacing between adjacent CRA detents is $T_W$. The NRZ input binary data spacing is denoted as $T_B$. Since three binary valued digits map into two ternary valued CRA digits, $T_W$ can be 1.5 $T_B$ for direct information density mapping. Under this condition, the CRA pulses are spaced further apart than would be the corresponding binary pulses resulting in improved intersymbol interference characteristics. If $T_W=T_B$, a 50% information density increase is achieved.

With continued reference to FIG. 2, the CRA read signal derived from a differentiating read head is illustrated adjacent each CRA encoding pattern. It is thus appreciated that each rising edge of a CRA break results in a positive read pulse and each falling edge of a CRA break results in a negative read pulse. Since each CRA break constitutes a doublet, two readback pulses of opposite polarity, as illustrated in FIG. 2, result from the corresponding CRA write waveforms. It is furthermore appreciated from the CRA read signal that the high frequency erase signal 10 results in a zero d.c. read back level. Illustrated adjacent the CRA read signal are conceptual representations of the decoded CRA data.

It will be appreciated that the mapping illustrated in FIG. 2 is arbitrary, other encodings into CRA digits being usable in practicing the invention. Additionally, encodings of groups of binary digits greater than groups of three into CRA cells comprising more than two CRA bits may also be utilized for further increased information density at the expense of system complexity in practicing the invention.

Figures 3, 3A:
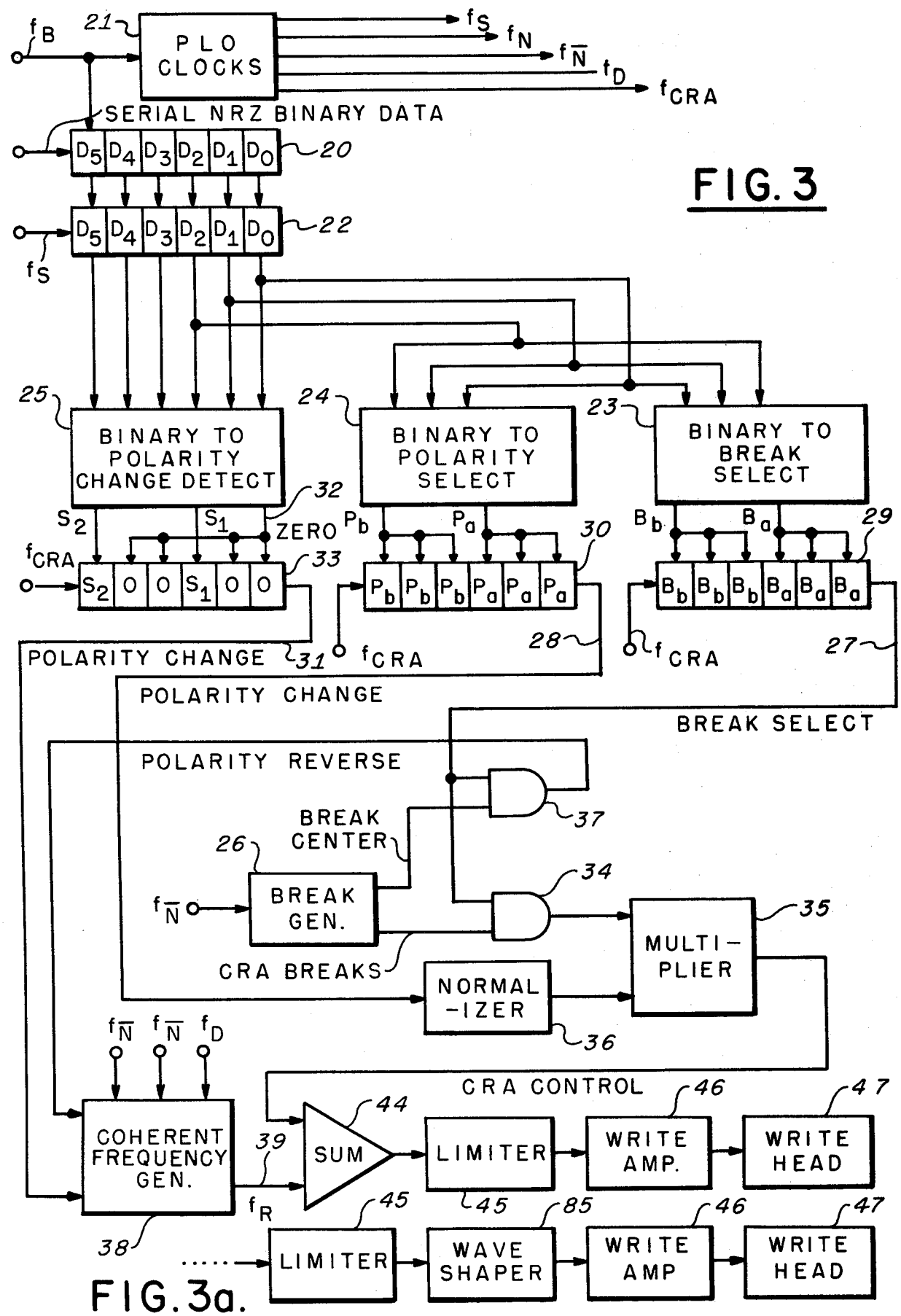
FIG. 3 is a schematic block diagram of the write system of the present invention.
FIG. 3A is a schematic block diagram of a portion of FIG. 3 illustrating an alternative arrangement therefor.
Figure 7:
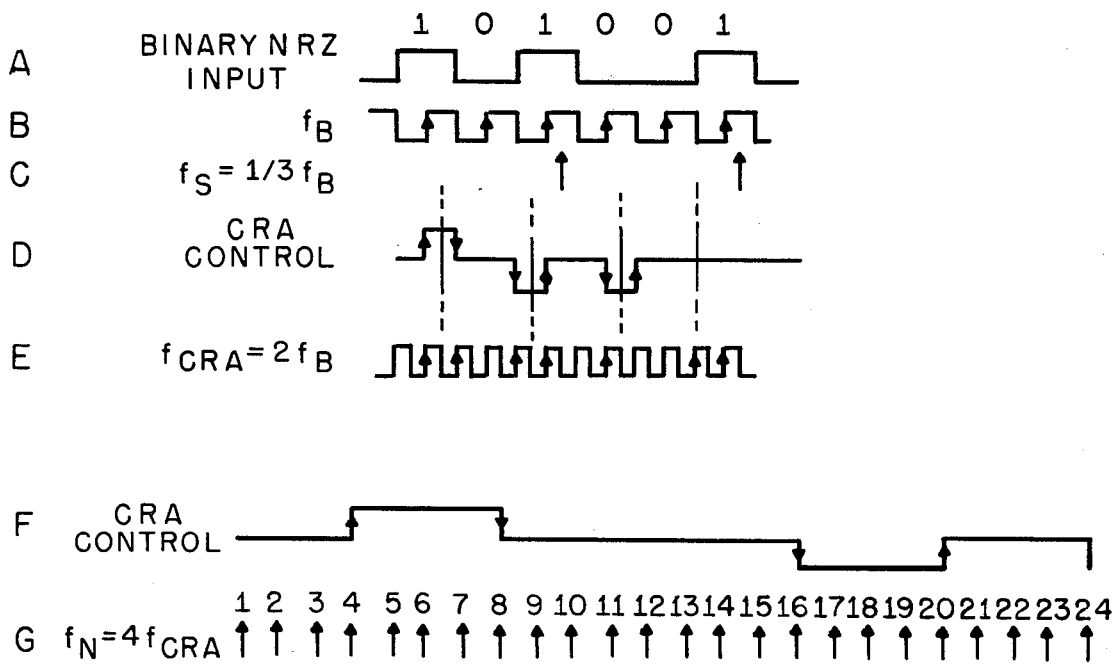
FIG. 7, consisting of A-G, is a waveform diagram illustrating the relationships between various waveforms generated within the system of FIG. 3.

Referring now to FIG. 3, a schematic block diagram of a preferred embodiment of the write portion of the system of the present invention is illustrated. Reference may also be made to FIG. 7 which depicts clock and control waveforms utilized in the apparatus of FIG. 3. Serial binary input data, for example in NRZ format, is applied to the input of a shift register 20 and is shifted through the register 20 by a binary input clock $f_B$. Exemplary binary data is illustrated on line A of FIG. 7 and the binary clock $f_B$ is illustrated on line B of FIG. 7. Preferably, the shift register 20 is a six stage register, the stages denoted as $D_0$ through $D_5$, respectively. It is appreciated that $D_5$ is the latest binary bit to occur and $D_0$ the earliest.

Figures 12, 17:
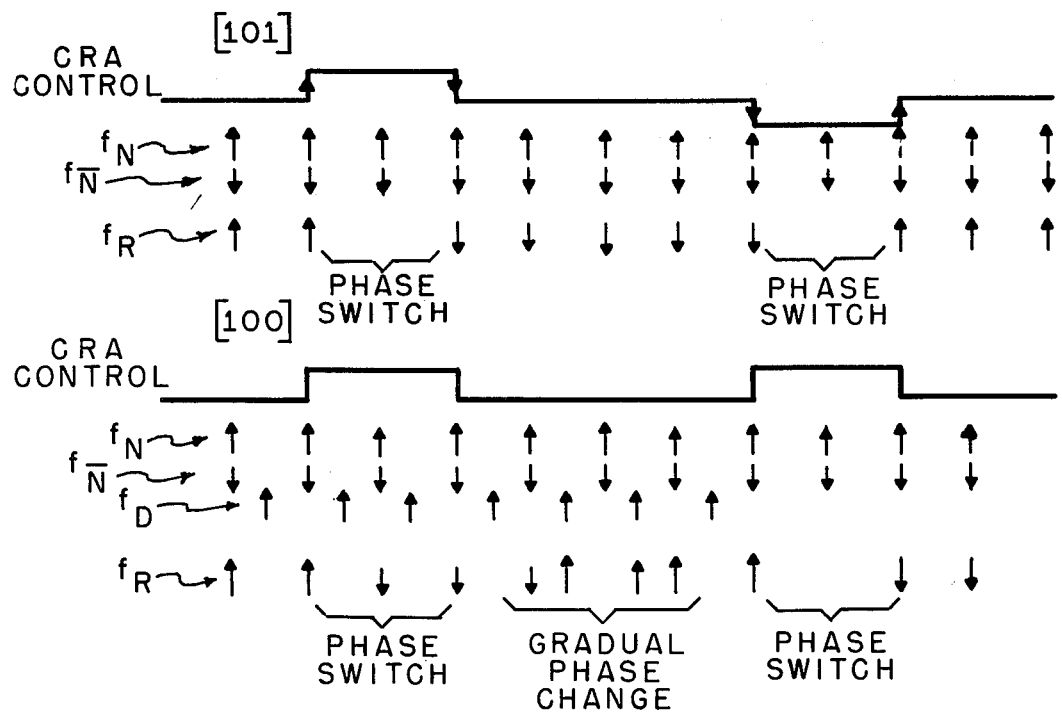
FIG. 12 is a waveform diagram illustrating the relationships between waveforms generated by the system of FIG. 3.
FIG. 17 is a logic table illustrating the logic implemented by the binary data recovery block of FIG. 16.

The binary clock $f_B$ is applied to a phase locked oscillator clock block 21 for generating the plurality of coherent clocks utilized in the system. The CRA clock $f_{CRA}$ has a frequency twice that of $f_B$ and occurs in phase therewith. The clock $f_{CRA}$ is illustrated on line E of FIG. 7. The sampling clock $f_S$ occurs at a rate one-third that of $f_B$ and is generated by inverting $f_{CRA}$ and dividing the inverted $f_{CRA}$ by 6. The $f_S$ clock is illustrated on line C of FIG. 7. It is appreciated that the clock, for convenience, is represented by arrows located at the rising edges of the clock waveform. A clock $f_N$ is generated for providing the high frequency a.c. erasure signal. The clock $f_N$ occurs in phase with $f_{CRA}$ and at four times the rate thereof. The $f_N$ clock is illustrated on line G of FIG. 7 wherefrom it is appreciated that 24 clock cycles of $f_N$ demarcate one CRA cell (FIG. 2). The inverse $\bar{f}_N$ of the high frequency clock $f_N$ is also generated by the clock block 21 and is provided by inverting $f_N$. A delayed clock $f_D$ is generated at the frequency of $f_N$ but delayed one-quarter clock period with respect thereto. The $f_D$ clock is illustrated in FIG. 12 and its function will be explained hereinbelow in the ensuing description of FIG. 3. It is appreciated that $f_N$ and $\bar{f}_N$ provide the high frequency erasure signal, phase locked to the CRA breaks with $f_D$ being utilized to provide smooth transitions between $f_N$ and $\bar{f}_N$ in a manner to be described. In the present embodiment of the invention, $f_N=4f_{CRA}=8f_B$. Generally, $f_N=kf_{CRA}=nkf_B$, where n is an integral value equal to or greater than 2.

As described above, the binary clock $f_B$ controls the shifting of the serial NRZ binary input data through the register 20. The stages $D_2$, $D_1$ and $D_0$ store the current three binary digits to be mapped into the current two CRA digits while the stages $D_5$, $D_4$, and $D_3$ contain three look-ahead binary digits to generate polarity change detect signals in a manner to be described. The digits $D_5$, $D_4$ and $D_3$ provide a one CRA cell look-ahead capability.

After every three shifts of NRZ through the register 20, the sampling clock $f_S$ strobes the six bits extant in the register 20 into a parallel buffer register 22. Thus, every sequentially occurring group of three binary input digits is loaded into the stages $D_2$, $D_1$ and $D_0$ of the buffer 22 for generation of the corresponding two CRA breaks with the look ahead bits $D_5$, $D_4$ and $D_3$ providing polarity change information.

Figure 13:
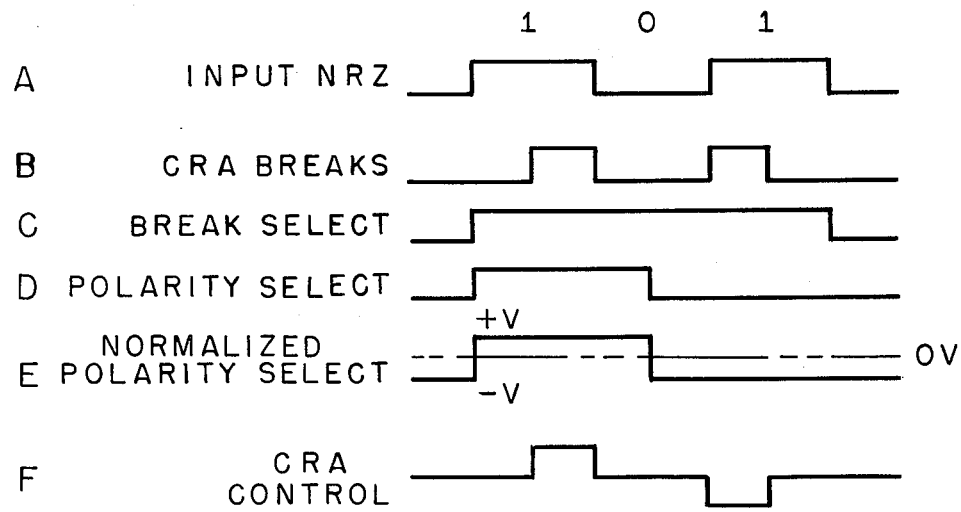
FIG. 13, consisting of A-F, is a waveform diagram useful in explaining the operation of the apparatus of FIG. 3.

The outputs of the $D_2$, $D_1$ and $D_0$ stages of the buffer register 22 are applied in parallel to binary to break select logic 23, binary to polarity select logic 24 and binary to polarity change detect logic 25. Additionally, the binary to polarity change detect logic 25 is coupled to receive the look ahead bits $D_5$, $D_4$ and $D_3$ from the buffer register 22. The apparatus of FIG. 3 also includes a break generator 26 that provides a continuous train of positive CRA break pulses coincident with the CRA break detents. The CRA break output waveform is illustrated on line A of FIG. 11 and line B of FIG. 13. The break generator 26 also provides a break center signal coincident with the occurrences of the center of the CRA breaks. The break center signal is utilized in a manner to be described for controlling the phase of the high frequency a.c. erase signal. The details of the break generator 26 will be described hereinbelow with respect to FIG. 9.

The binary to break select logic 23 provides a break select signal on a lead 27 in accordance with the current group of three input bits. The break select signal on the lead 27 is utilized to transmit CRA breaks from the break generator 26 where required in accordance with the input data and to gate out those breaks where a break absence is required in accordance with the input data. The binary to polarity select logic 24 provides a polarity select signal on a lead 28 that inverts the polarity of the CRA breaks from the break generator 26 that are gated through by the break select signal on the lead 27 when the break is required to be a negative break in accordance with the input data. The manner in which the CRA breaks are transmitted and polarity controlled will be explained in detail hereinbelow.

The binary to break select logic 23 provides logic control signals $B_a$ and $B_b$ in accordance with the binary input digits $D_2$, $D_1$ and $D_0$. The logic 23 is implemented to provide the $B_a$ and $B_b$ signals in accordance with the Table of FIG. 4. It is appreciated that the binary to break select logic 23 may be implemented, for example, by conventional combinational logic or ROM table look up procedures so as to provide the signals as indicated in FIG. 4. The binary to break select logic 23 may be simplified by implementing the Boolean equations:

$$B_a = D_2 + D_1$$

$$B_b = D_2 + \overline{D}_1$$

The binary to polarity select logic 24 provides logic control signals $P_a$ and $P_b$ in accordance with the binary input digits $D_2$, $D_1$ and $D_0$. The logic 24 is implemented to provide the $P_a$ and $P_b$ signals in accordance with the table of FIG. 4. The logic 24 may be implemented, for example, utilizing conventional combinational logic or ROM table look up procedures so as to provide the signals indicated in FIG. 4. It will be appreciated that the binary to polarity select logic 24 may be simplified by implementing the following equations:

$$P_a = \overline{D}_0$$

$$P_b = \overline{D}_1(D_2 + \overline{D}_0)$$

The $B_a$ signal from the binary to break select logic 23 is applied in parallel to the first three stages of a six stage shift register 29 and the $B_b$ signal is applied to the last three stages of the six stage shift register 29. The register 29 is shifted by the CRA clock $f_{CRA}$ to provide the break select signal on the lead 27. The break select signals are denoted as $B_1$, $B_2$ and $B_3$ in FIG. 4 and are illustrated in FIG. 5. The $B_1$ signal transmits the first break of a CRA cell and blocks the second break. The $B_2$ signal transmits the second break of a CRA cell and blocks the first break. The $B_3$ signal transmits both breaks. It is appreciated that six $f_{CRA}$ clock pulses occur for each $f_s$ pulse and that six $f_{CRA}$ pulses demarcate one CRA cell. Thus, for every three binary input digits loaded into the buffer register 22, the appropriate break select signal is applied to the lead 27 to control the presence and absence of breaks in the CRA cells in accordance with the CRA write digital waveform of FIG. 2.

In a manner identical to that described with respect to the break select signal, the binary to polarity select logic 24 applies the $P_a$ and $P_b$ signals to a shift register 30 which in turn provides the polarity select signal on the lead 28. The polarity select signals are denoted as $P_1$, $P_2$ and $P_3$ as delineated in FIG. 4 and as illustrated in FIG. 5. In a manner to be explained, the $P_1$ polarity select signal inverts the polarity of the first CRA break in a CRA cell while the $P_2$ polarity select signal inverts the second CRA break. The $P_3$ polarity select signal inverts the polarities of both CRA breaks in a CRA cell.

The binary to polarity change detect logic 25 provides a polarity change signal on a lead 31 in accordance with the current group of three input bits $D_2$, $D_1$ and $D_0$ as well as the associated look ahead bits $D_5$, $D_4$ and $D_3$. The polarity change signal on the lead 31 controls a gradual phase change of the a.c. erase signal between CRA breaks so as to provide the correct polarity for the CRA break leading edges in accordance with the mapping illustrated in FIG. 2.

The binary to polarity change detect logic 25 provides logic control signals $S_1$ and $S_2$ in accordance with the binary input digits $D_5$, $D_4$, $D_3$, $D_2$, $D_1$ and $D_0$. The logic 25 is implemented to provide the $S_1$ and $S_2$ signals in accordance with the table of FIG. 6. The logic 25 may be implemented utilizing, for example, conventional combinational circuits or ROM table look up procedures so as to provide the signals delineated in FIG. 6. It will be appreciated that the binary to polarity change detect logic 25 may be simplified by implementing the following Boolean equations:

$$S_1 = \overline{D}_2 D_1(\overline{D}_3\overline{D}_0 + D_3 D_0) + D_2(\overline{D}_1\overline{D}_0 + D_1 D_0)$$

$$S_2 = \overline{D}_2\overline{D}_1(\overline{D}_3\overline{D}_0 + D_3 D_0) + D_2(\overline{D}_3\overline{D}_1 + D_3 D_1)$$

The binary to polarity change detect logic 25 also provides a lead 32 conveying the constant logic zero signal.

The $S_1$ and $S_2$ signals from the logic circuit 25 are applied to the third and sixth stages respectively of a six stage shift register 33. The logic zero signal from the circuit 25 is applied to the remaining stages of the register 33. The register 33 is shifted by the CRA clock $f_{CRA}$ to provide the polarity change signal on the lead 31. The shifting of the register 33 is synchronized with the system clock whereby the $S_1$ signal exits the register 33 following the occurrence of the first CRA break in a CRA cell to determine whether or not a phase change is required in the a.c. erase signal so as to provide the proper polarity at the next occurring CRA break. The next occurring CRA break may be either the second break of the CRA cell or if the second break is absent, the $S_1$ signal provides the appropriate information whereby the next actual break to occur in the following CRA cell will have the appropriate polarity. The $S_2$ signal exits the register 32 following the occurrence of the second CRA break in a CRA cell and determines whether or not the a.c. erasure signal requires a phase change to provide the correct polarity for the next occurring CRA break in the next occurring CRA cell.

Figure 11:
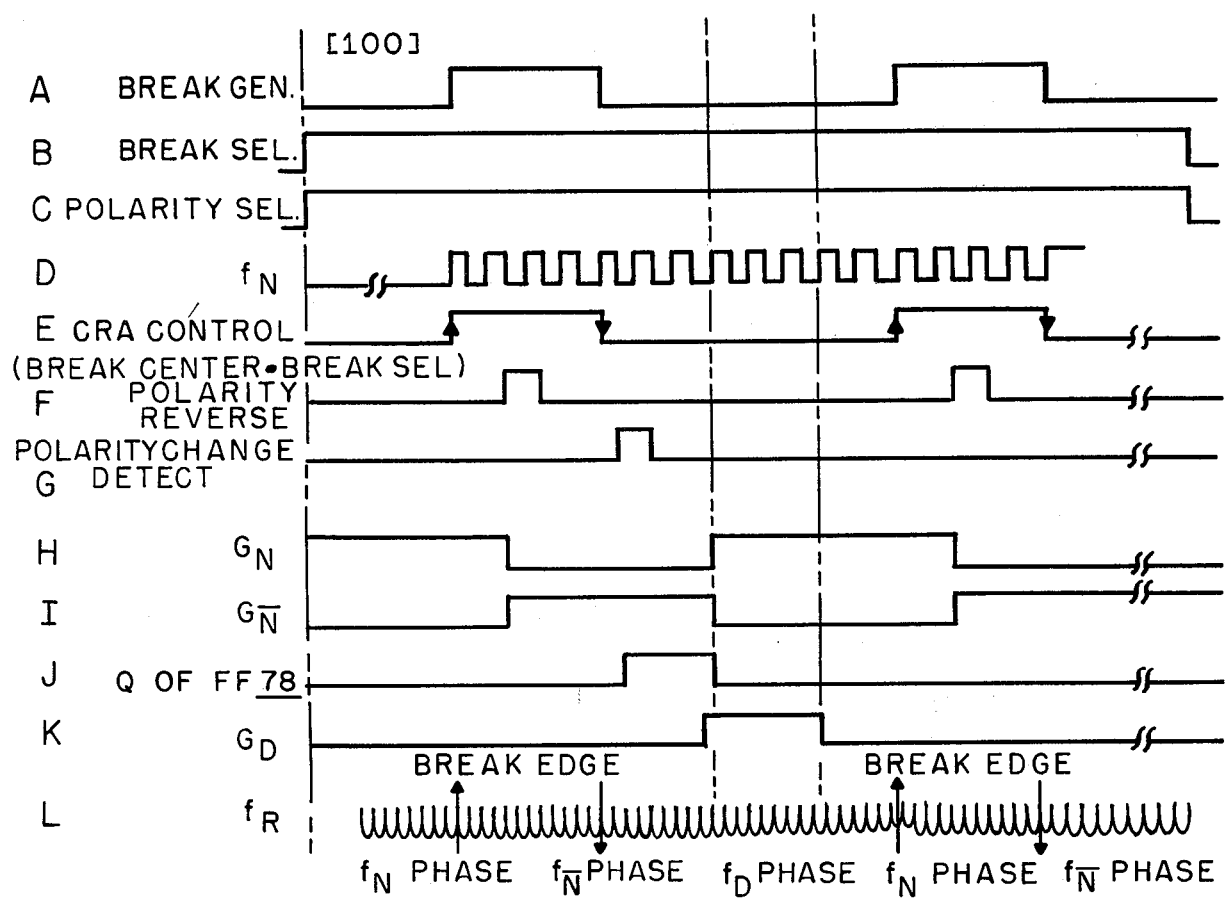
FIG. 11, consisting of A-L, is a waveform diagram illustrating the relationships between waveforms generated by the apparatus of FIGS. 3 and 10.

As discussed above, the break generator 26 provides the CRA break waveform comprising a continuous train of positive going CRA breaks at the CRA break detents timed by the system clock $f_N$. The CRA break waveforms are illustrated on line A of FIG. 11 and line B of FIG. 13. The break generator 26 applies the CRA breaks to an AND gate 34. The other input to the AND gate 34 is coupled to receive the break select signal on the lead 27. Thus, the break select signal on the line 27 gates out the CRA breaks where the binary to CRA mapping discussed above with respect to FIG. 2 requires the absence of a break. The output of the gate 34 is applied as an input to a multiplier 35. Lines A and B of FIG. 11 illustrate two CRA breaks on line A being gated through by the break select signal on line B to provide the CRA control signal on line E. With respect to FIG. 13, the CRA breaks on the line B thereof are gated through by the break select signal on the line C to provide the CRA control signal on the line F of FIG. 13.

With continued reference to FIG. 3, the polarity select signal on the lead 28 is applied to a normalizer or level shifter 36. The normalizer 36 converts the unipolar polarity select signal to a bipolar normalized polarity select signal. For example, the polarity select signal on the lead 28 may vary from zero volts to 3 volts whereas the normalized polarity select signal may vary about zero volts by ±1.5 volts. An example of a polarity select signal and the corresponding normalized polarity select signal is illustrated on lines D and E of FIG. 13.

The output of the normalizer 36 is applied to the second input of the multiplier 35. The output of the multiplier 35 is the product of the normalized polarity select signal and the CRA breaks gated through by the break select signal. When the normalized polarity select signal is a positive voltage, the positive CRA breaks transmitted through the gate 34 are applied to the output of the multiplier 35 as positive going pulses. When the normalized polarity select signal is a negative voltage, the CRA breaks transmitted by the AND gate 34 are inverted providing negative going CRA breaks at the output of the multiplier 35. The positive and negative going CRA breaks provided by the multiplier 35 in response to the break select and polarity select signals provides the CRA control signal. This signal is illustrated on line E of FIG. 11 and line F of FIG. 13. The CRA control signal conveys the absence or presence of the breaks and the polarities corresponding to the binary input information in accordance with the mapping illustrated in FIG. 2. The CRA control signal is added to the high frequency erasure signal to form the CRA write signal discussed above with respect to FIGS. 1 and 2. The phase of the high frequency erase signal is controlled whereby the appropriate polarity of the erase signal occurs in coincidence with the rising and falling edges of the CRA breaks of the CRA control signal.

The CRA control signal from the multiplier 35 is utilized to embed positive and negative CRA breaks in the high frequency erase signal. In order to effect polarity coherence between the CRA breaks and the high frequency erase signal, the phase of the high frequency erase signal is inverted during the occurrence of each break gated through by the break select signal. This is required since in the present embodiment an integral number of cycles of the high frequency erase signal occur during each CRA break. In particular, in the embodiment described herein, four cycles of the high frequency erase signal occur during each CRA break. This is illustrated in FIG. 7, lines F and G. To control the phase reversal of the high frequency erase signal desired during the CRA break, the break center signal from the break generator 26 is applied to an AND gate 37 which also receives the break select signal on the line 27. As discussed above, the break generator 26 provides a break center pulse at the center of each CRA break. The break center signal from the break generator 26 is transmitted through the AND gate 37 by the break select signal that controls the transmission of the CRA breaks through the AND gate 34. The break center signals transmitted through the AND gate 37 are denoted as the polarity reverse signal which is illustrated on line F of FIG. 11.

The polarity change signal on the line 31 from the shift register 33 and the polarity reverse signal from the AND gate 37 are applied as inputs to a coherent frequency generator 38. The coherent frequency generator 38 also receives the clock signals $f_N$, $f_{\bar{N}}$ and $f_D$ from the PLO clock block 21. In response to the clock signals $f_N$, $f_{\bar{N}}$ and $f_D$ as controlled by the polarity change signal and the polarity reverse signal, the coherent frequency generator provides the high frequency erase signal $f_R$ on a line 39. The coherent frequency generator 38 provides either $f_N$, $f_{\bar{N}}$ or $f_D$ as the $f_R$ signal on the line 39 in accordance with the required phase coherence with respect to the CRA breaks. During each CRA break gated through by the break select signal, the polarity reverse signal switches $f_R$ from $f_N$ to $f_{\bar{N}}$ or from $f_{\bar{N}}$ to $f_N$. For example, if $f_N$ is polarity coherent with the leading edge of a CRA break, $f_N$ is provided as the $f_R$ signal up to the break. In order to achieve polarity coherence with the trailing edge of the break, the polarity reverse signal that occurs at the break center, switches the $f_R$ signal to $f_{\bar{N}}$. If conversely the $f_{\bar{N}}$ signal is coherent with the leading edge of the break, the polarity reverse signal switches $f_R$ to $f_N$ at the break center to achieve polarity coherence at the trailing edge of the break. At the termination of a break, the polarity change signal from the shift register 33 controls $f_R$ to be polarity coherent at the leading edge of the next following break. For example, if $f_R$ resumes with $f_N$ at the termination of a break and it is determined by the look-ahead logic embodied in the binary-to-polarity change detect circuit 25 that $f_{\bar{N}}$ is required at the leading edge of the next following break, the polarity change signal from the shift register 33 switches, at a time between the two breaks, $f_N$ to $f_D$ and then to $f_{\bar{N}}$ to provide the $f_R$ signal. This procedure effects a gradual change from $f_N$ to $f_{\bar{N}}$ between the occurrence of the breaks having a minimal effect on the erase function of the high frequency erase signal. Conversely, when $f_R$ resumes as $f_{\bar{N}}$ at the termination of a break and $f_N$ is required at the leading edge of the next occurring break, the polarity change signal effects the sequence $f_{\bar{N}}$ to $f_D$ to $f_N$ to provide the high frequency erase signal $f_R$ in order to achieve the required polarity coherence while affecting a gradual change in the phase of the high frequency clock signal. This procedure minimizes the magnetization effect on the medium of the phase change.

As explained above, FIG. 7, lines F and G illustrate the timing relationship between the $f_N$ clock and the CRA control signal. FIG. 12 illustrates the polarity coherent high frequency erase signal $f_R$ with respect to two examples of CRA control signals for two exemplary groups of three binary input digits. In the upper example of FIG. 12, the CRA control signal for digits 1 0 1 (CRA symbol 5) is illustrated with accompanying $f_R$ clock indications. It is appreciated that for clarity, arrows are utilized to designate the polarity of pertinent leading edges of the clock waveform. As illustrated, $f_R$ is comprised of either $f_N$ or $f_{\bar{N}}$ in accordance with the polarity coherence required. The second example of FIG. 12 is provided for the binary group 1 0 0 (CRA symbol 4) and as illustrated, $f_R$ is comprised of $f_N$, $f_{\bar{N}}$ or $f_D$ to effect the polarity reversals during the breaks and the gradual polarity change between the breaks as required to maintain polarity coherence at the leading and trailing edges of the breaks.

Figure 14:
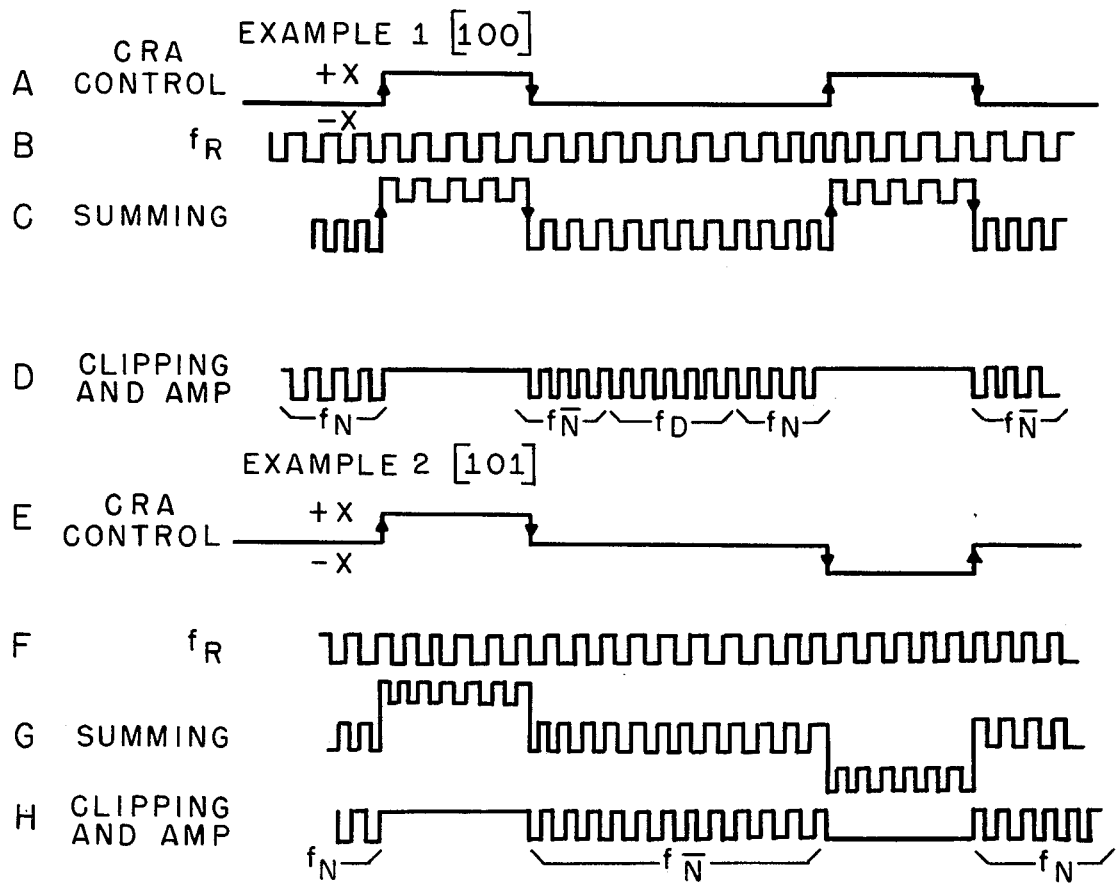
FIG. 14, consisting of A-H, is a waveform diagram illustrating waveforms generated by the system of FIG. 3 with respect to specific examples of input data.

The CRA write waveform as illustrated in FIGS. 1 and 2 is achieved by summing the polarity coherent high frequency erase signal $f_R$ from the coherent frequency generator 38 with the CRA control signal from the multiplier 35 and clipping the resultant summed signal. Accordingly, the CRA control signal from the multiplier 35 and the $f_R$ signal on the lead 39 are applied as inputs to a summing amplifier 44. FIG. 14 provides two examples of the generation of the CRA write signal where lines A and E illustrate CRA control signals, lines B and F illustrate the $f_R$ signal and lines C and G indicate the result of summing the respective CRA control signals and $f_R$ signals. The output of the summing amplifier 44 is applied to a limiter or clipper 45 to provide the final CRA write waveform. FIG. 14, lines D and H illustrate the clipped signal which provides the CRA write waveform illustrating the CRA breaks embedded in the high frequency dither. Lines D and H of FIG. 14 also indicate the regions where $f_R$ is $f_N$, $f_{\bar{N}}$ and $f_D$. The CRA write waveform from the limiter 45 is applied via a write amplifier 46 to a write head 47 for recording on the medium.

Figure 8:
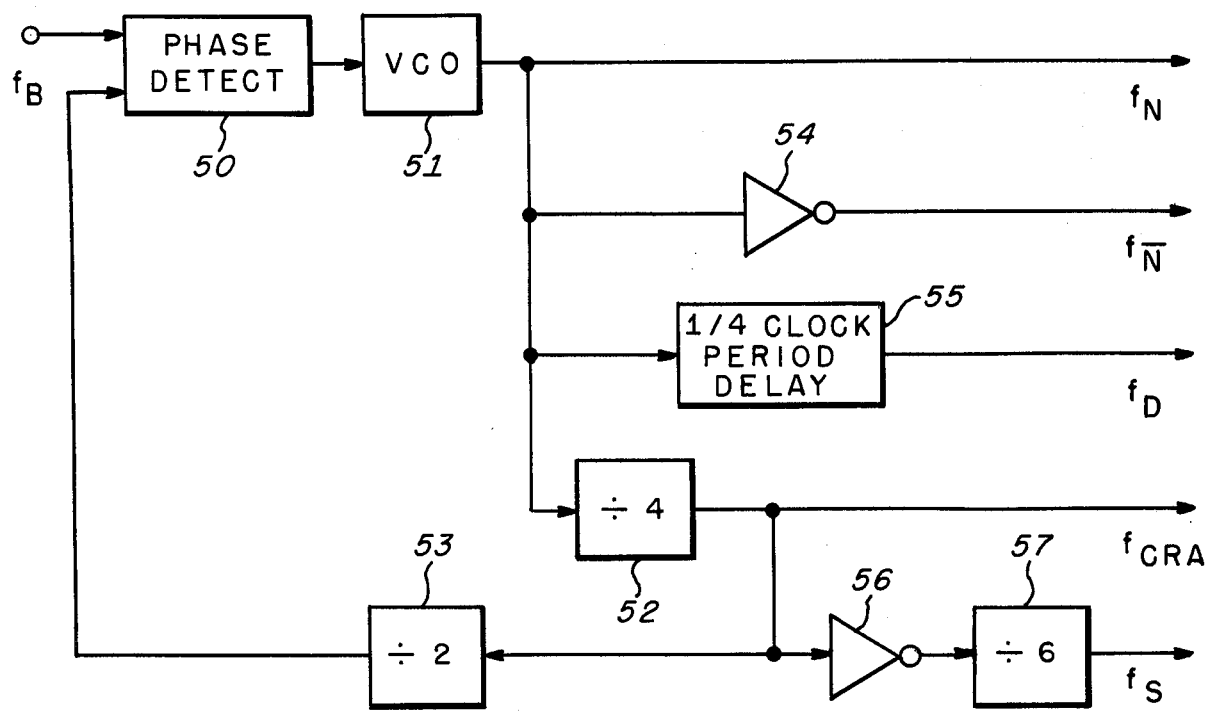
FIG. 8 is a schematic block diagram of an embodiment of the PLO clock block of FIG. 3.

Referring now to FIG. 8, an implementation of the PLO clock block 21 of FIG. 3 is illustrated. The embodiment of FIG. 8 essentially comprises a phase locked loop synchronized by the binary clock $f_B$. The binary clock $f_B$ is applied to a phase detector 50, the output of which is coupled to a voltage controlled oscillator 51. It is appreciated that the phase detector block 50 also includes conventional circuitry for implementing a phase locked loop. The oscillator 51 is designed to provide the high frequency erase signal $f_N$. Since, as discussed above, the $f_N$ signal has a frequency eight times that of $f_B$, the $f_N$ signal is divided down to the frequency of $f_B$ via a divide by four circuit 52 and a divide by two circuit 53. Thus it is appreciated that the elements 50, 51, 52 and 53 form a phase locked loop that tracks the binary clock providing the synchronized high frequency clock $f_N$. The $f_{\bar{N}}$ clock is provided by inverting the $f_N$ signal via an inverter 54. The $f_D$ clock is derived from $f_N$ by transmitting $f_N$ through a one-quarter clock period delay 55. The $f_{CRA}$ clock is provided by dividing the $f_N$ clock via the divide by four circuit 52. The $f_S$ signal is derived by inverting $f_{CRA}$ via an inverter 56 and dividing the inverted $f_{CRA}$ signal via a divide by six circuit 57. As discussed above, the various clock signals are illustrated in FIG. 7 and 12. It will be appreciated that the various clock signals synchronized with respect to each other provide the high frequency erase signal coherent in polarity with the CRA control signal thereby providing the polarity coherent CRA write digital waveform as described above.

An alternative arrangement for generating the system clocks may be effected in the following manner. The break select signal, the polarity select signal, the polarity change signal and the polarity reverse signal may be utilized for gating $f_N$, $f_{\bar{N}}$ and $f_D$ to provide the appropriate polarity coherent clock and applying the gated clock to a phase locked loop which in turn provide the $f_R$ high frequency erase signal. Additionally, the gradual transitions between $f_N$ and $f_{\bar{N}}$ may be effected by more than one interim clock for providing an even smoother high frequency erase signal phase transition than that described above with respect to the interim clock $f_D$.

Figure 9:
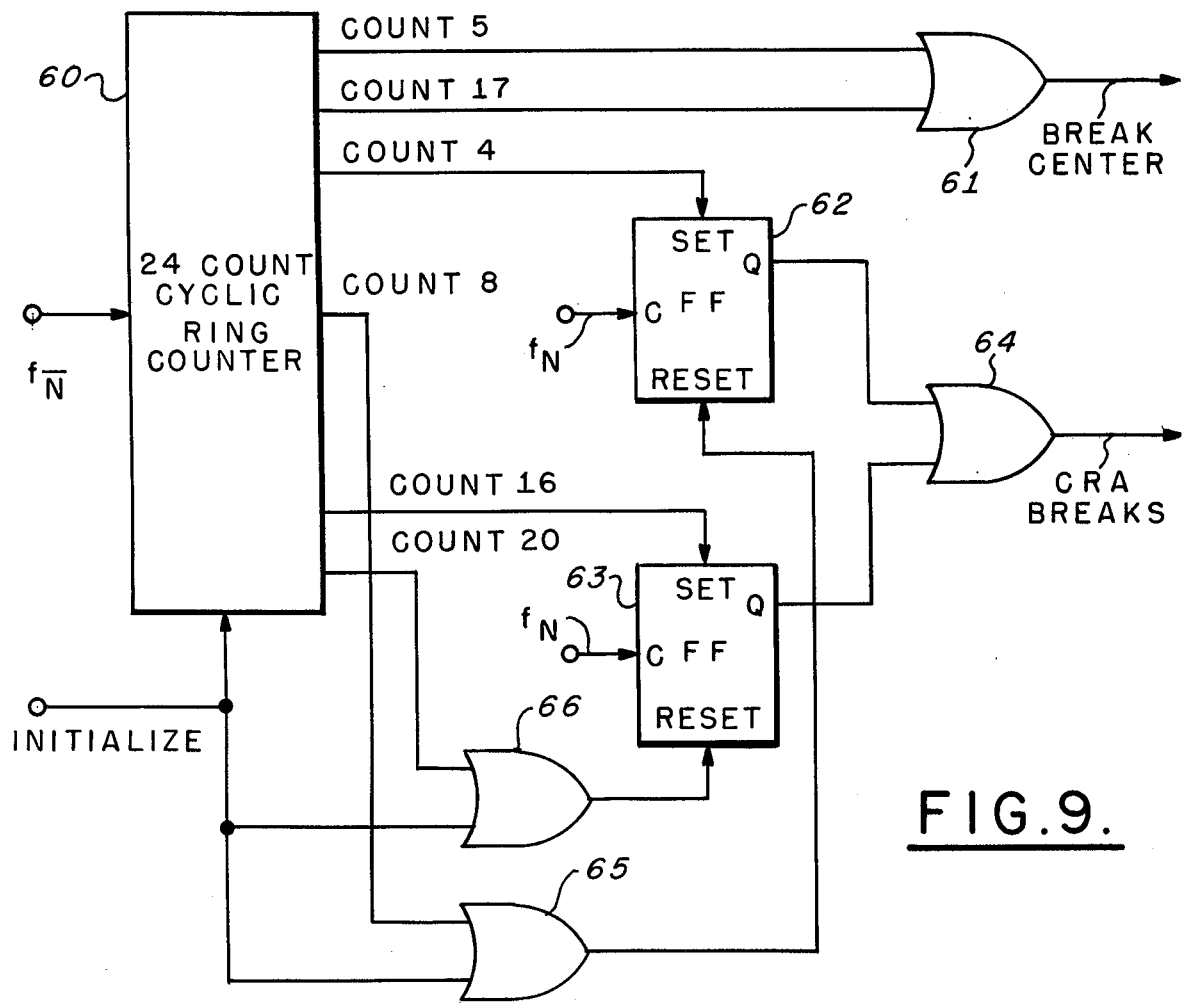
FIG. 9 is a schematic block diagram of an embodiment of the break generator block of FIG. 3.

Referring now to FIG. 9, an implementation of the break generator 26 of FIG. 3 is illustrated. A 24 count cyclic ring counter 60 receives the $f_{\bar{N}}$ signal on the clock input thereof to provide pulses at various counts of the counter 60 as indicated by the legends. The cyclic ring counter 60 may comprise a content alterable sequential state, divide by 24 counter with a conventional decoder coupled to the output thereof to provide the count signals. FIG. 7 lines F and G illustrate the 24 count correspondence with the CRA breaks of a CRA cell. The break center signals with respect to the first and second breaks of the CRA cell are provided by the count 5 and count 17 outputs, respectively, of the counter 60 via an OR gate 61. The leading edge of the first CRA break is defined by the count 4 signal and the trailing edge by the count 8 signal. Accordingly, the Q output of a set reset flip-flop 62 clocked by $f_N$ wherein the set input is coupled to the count 4 output of the counter 60 and the reset input to the count 8 output of the counter 60 provides the first CRA break of the CRA cell. The described timing may be appreciated from lines F and G of FIG. 7 and by reference to line B of FIG. 13 that illustrates the CRA breaks.

In a similar manner, the second break of the CRA cell is defined by counts 16 and 20 of the counter 60 and implemented by a flip-flop 63. The two CRA breaks of a CRA cell generated by the flip-flops 62 and 63 are applied to an OR gate 64 which provides the CRA break signal discussed above with respect to FIG. 3. The break generator 26 may be initialized by resetting the counter 60 to zero and resetting the flip-flops 62 and 63. An initialize signal applied to the counter 60 and to the reset inputs of the flip-flops 62 and 63 via OR gates 65 and 66, respectively provide the initialization function. The reset inputs to the flip-flops 62 and 63 are responsive to the respective count 8 and count 20 signals from the counter 60 via the OR gates 65 and 66 respectively.

It will be appreciated that utilizing 24 counts of the high frequency clock signal to define the CRA breaks of a CRA cell is arbitrary, other count relationships being useable in practicing the invention. Alternatively, the breaks may be generated by a prestored sequential shift register wherein ONE's are stored at the potential break location and ZERO's at the locations between the breaks. Such a shift register may be clocked by $f_{\bar{N}}$.

Figure 10:
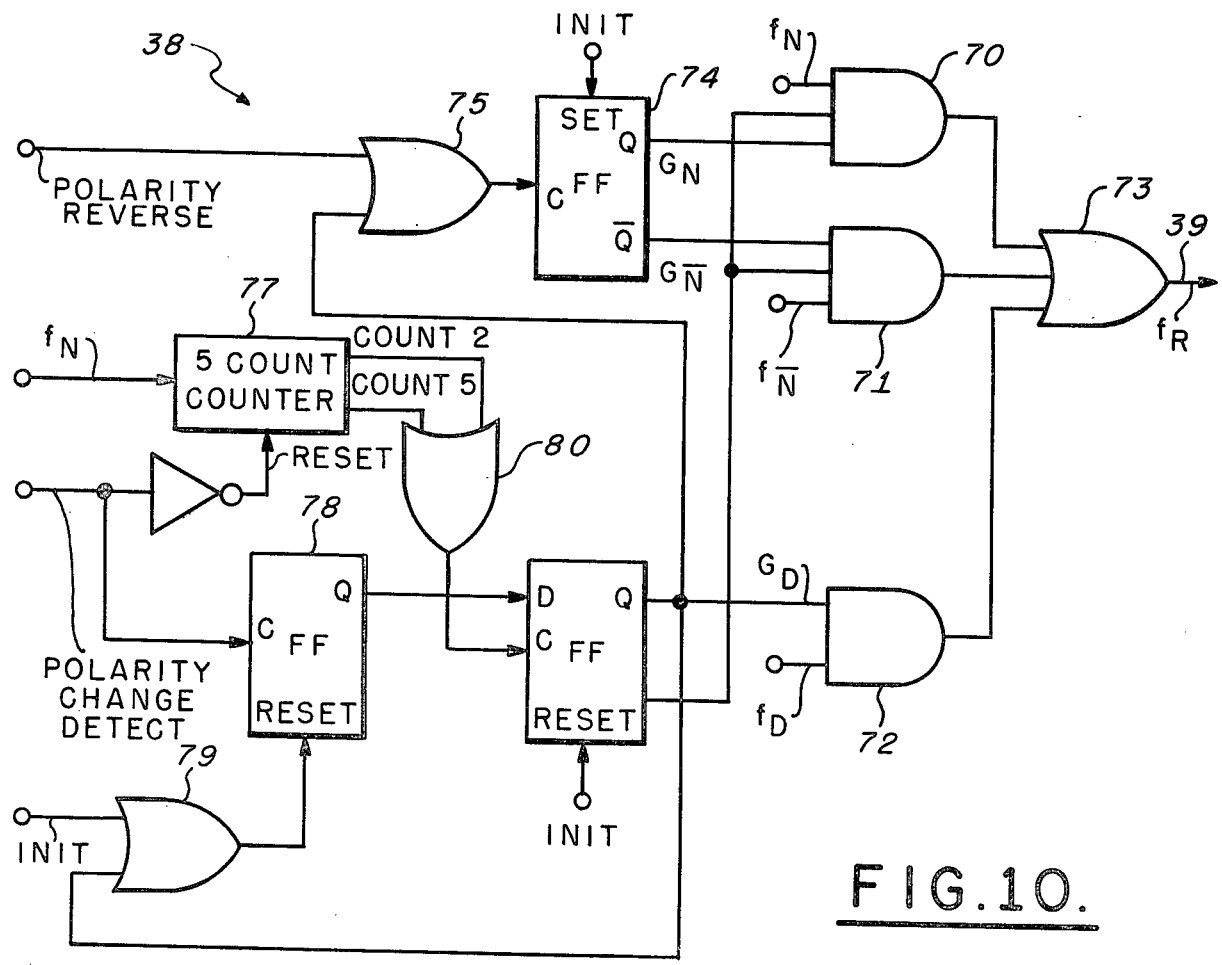
FIG. 10 is a schematic block diagram of an embodiment of the coherent frequency generator block of FIG. 3.

Referring now to FIG. 10, an implementation of the coherent frequency generator 38 of FIG. 3 is illustrated. As previsouly described, the coherent frequency generator 38 provides the high frequency erase signal $f_R$ that is coherent in polarity with the CRA control signal. This is achieved by utilizing either $f_N$, $f_{\bar{N}}$ or $f_D$ as the $f_R$ signal. Accordingly, $f_N$, $f_{\bar{N}}$ and $f_D$ are applied as inputs to respective AND gates 70, 71 and 72. The outputs of the AND gates 70, 71 and 72 are applied as inputs to an OR gate 73 which, in turn, provides the $f_R$ signal. The Q and $\bar{Q}$ outputs of a toggle flip-flop 74 are applied as inputs to the AND gates 70 and 71. The clock input input to the flip-flop 74 is provided by the polarity reverse signal via an OR gate 75. Thus whenever the polarity reverse signal is provided to the OR gate 75, the flip-flop 74 toggles to the state opposite the state extant prior to receipt of the polarity reverse signal. Accordingly, $f_N$ of $f_{\bar{N}}$ provides the $f_R$ signal in a mutually exclusive manner. The Q output of the flip-flop 74 is denoted as $G_{\bar{N}}$ indicating "gate $f_{\bar{N}}$" while the $\bar{Q}$ output of the flip-flop 74 is denoted as $G_N$, indicating "gate $f_N$".

In the preferred embodiment of the invention, the CRA breaks are generated by the break generator 26 (FIG. 9) whereby when one of $f_N$ and $f_{\bar{N}}$ is polarity coherent with the leading edge of a break, the inverse clock will be polarity coherent with the trailing edge of the break. This is evident in FIG. 7, lines F and G. Thus, whenever a break is gated through by the break select signal as discussed above, the polarity reverse signal is applied to toggle flip-flop 74 via the OR gate 75 whereby the inverse clocks $f_N$ and $f_{\bar{N}}$ are utilized to define the respective edges of the break. The polarity reverse signal occurs at the break center and therefore the clocks are switched during the break.

A d-type flip-flop 76 is included in the coherent frequency generator 38 which when in the reset state enables the AND gates 70 and 71 via the $\bar{Q}$ output thereof while disabling the AND gate 72 via the Q output thereof. The flip-flop 76 and the remaining components of FIG. 10 are utilized in effecting a gradual polarity change between breaks. As observed in FIG. 11, line G, the polarity change signal occurs directly after the trailing edge of a break to control the required polarity for the next occurring break as discussed above with respect to FIG. 3. The polarity change detect signal is utilized to reset a five count counter 77 to zero and to clock a toggle flip-flop 78. Initially the flip-flop 74 is set to its Q state while the flip-flops 76 and 78 are reset to the $\bar{Q}$ states. The initializing signal is applied to reset the flip-flop 78 via an OR gate 79. The counter 77 counts $f_N$ clock pulses.

When a polarity change detect signal occurs the flip-flop 78 is toggled to the Q state and the counter 77 is reset to zero. After counting two $f_N$ clock pulses, the counter 77 provides the count 2 signal which clocks the D flip-flop 76 through an OR gate 80. Since the D input of the flip-flop 76 is coupled to the Q output of the flip-flop 78, the flip-flop 76 is set to the Q state by the count 2 signal from the counter 77. When the flip-flop 76 is switched to the Q state, the Q output thereof resets the flip-flop 78 via the OR gate 79 and enables the AND gate 72 while the $\bar{Q}$ output disables the AND gates 70 and 71. The Q output of the flip-flop 76 also toggles the flip-flop 74 via the OR gate 75 to the state opposite its extant state. Since the flip-flop 78 has been reset, when the counter 77 attains the count 5, the flip-flop 76 is toggled back to the $\bar{Q}$ state which disables the AND gate 72 and enables the AND gates 70 and 71.

It is thus appreciated that when the polarity change detect signal indicates that the next occurring break has a leading edge requiring the clock ($f_N$ or $f_{\bar{N}}$) opposite to the extant clock, the counter 77 demarcates an interval occurring between breaks in which the extant clock ($f_N$ of $f_{\bar{N}}$) is terminated, $f_D$ is substituted therefor, and the opposite clock $f_N$ or $f_{\bar{N}}$ as the case may be gated through after the termination $f_D$. Thus when it is required, a gradual change in the polarity of the high frequency erase signal is effected to maintain polarity coherence with the CRA breaks. The operations described with respect to FIG. 10 are illustrated by the waveforms of FIG. 11. FIG. 12 provides two examples of the polarity coherence feature of the preferred embodiment of the present invention.

It is appreciated from the foregoing that the $f_R$ high frequency erase signal is locked in phase with the CRA breaks and is controlled via the circuit of FIG. 10 to provide clock pulse edges of the same polarity as the synchronous breaks. Thus the present invention provides complete freedom of directionality with respect to break polarity. The hereindescribed embodiment of the invention is implemented utilizing one intermediate clock phase $f_D$ to obtain a gradual transition from $f_N$ and $f_{\bar{N}}$ and from $f_{\bar{N}}$ to $f_N$. Additional clock phases may be introduced to provide an even smoother phase change. Alternatively the phase may be switched directly between $f_N$ and $f_{\bar{N}}$ without an intermediate clock phase if the sudden phase switch can be tolerated with respect to magnetization of the medium between controlled breaks. A further alternative arrangement is to utilize the rising and falling edges of the $f_N$ signal, gating the proper polarities for the breaks where they occur in the clock signal. This approach may result in playback pulse jitter which may be minimized by utilizing as high an $f_N$ dither frequency as possible. In the above described embodiment the polarity reverse signal switches the clock phase in the middle of each break that is gated through. Other arrangements may utilize relative break timing and dither phase whereby both the leading and trailing edges of a break are polarity coherent with the same clock. This arrangement would obviate the requirement for reversing clock polarity during the breaks. If desired, the $f_R$ dithering signal may be smoothed via filtering or phase locked loop techniques to minimize perterbations during phase shifting in the active recording zones.

Referring now to FIG. 3a in which like reference numerals indicate like components with respect to FIG. 3, an alternative arrangement for generating the CRA write waveform is illustrated. A wave shaping circuit 85 may be included interposed between the limiter 45 and the write amplifier 46 for shaping the CRA breaks and/or the adjacent dither pulses for providing enhanced performance.

Figure 15:
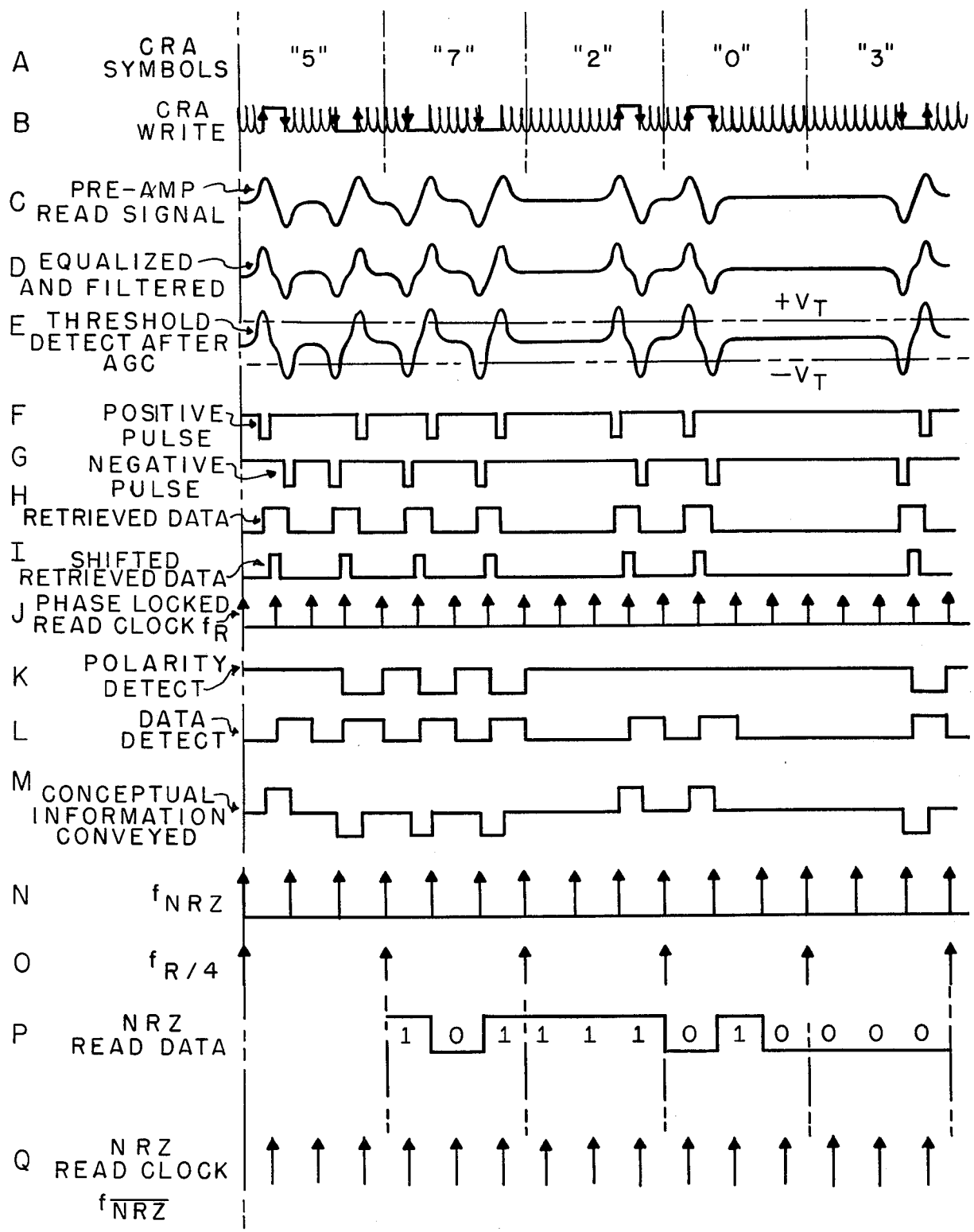
FIG. 15, consisting of A-Q, is a waveform diagram illustrating the relationships between waveforms with respect to the read system of the present invention.

FIGS. 1–14 discussed hereinabove describe the write system of the present invention. As explained, FIG. 2 illustrates the binary to CRA mapping, the CRA write digital waveforms corresponding to groups of three binary input digits and the CRA read signal corresponding to each CRA write signal. The read system of the present invention will now be described with respect to FIGS. 15, 16 and 17. Line A of FIG. 15 illustrates an arbitrary string of CRA symbols and line B of FIG. 15 illustrates the write waveform corresponding to the CRA symbols of line A. Line C of FIG. 15 illustrates the readback signal corresponding to the CRA write signal of line B. It is appreciated that the high frequency dithering signal essentially provides zero readback output and therefore the data is conveyed by the CRA break locations and their polarities. Since the break width is small, and the readback pulse pairs have strong self-demagnetization, the readback pulses have uniform magnitudes for both polarities.

Figure 16:
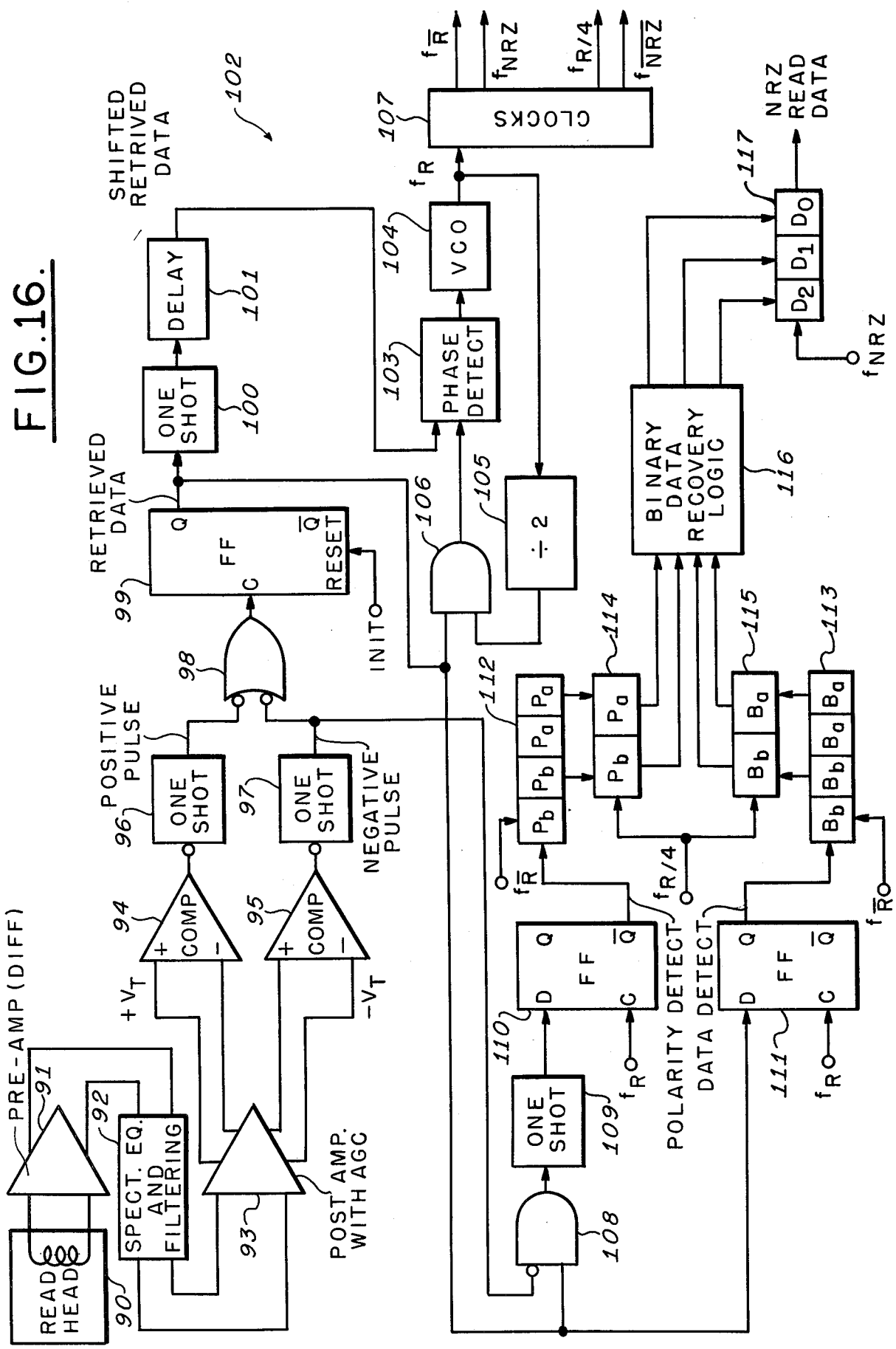
FIG. 16 is a schematic block diagram of the read system of the present invention.

Referring to FIG. 16, with continued reference to FIG. 15, a read head 90 responsive to the recorded CRA write signal provides, via a conventional differential preamplifier 91, the readback signal such as that illustrated on line C of FIG. 15. In order to enhance signal-to-noise ratio and resolution, the readback signal from the preamplifier 91 is passed through conventional spectral equalization and filtering circuitry 92. The equalized and filtered signal from the circuitry 92 is illustrated on line D of FIG. 15. The equalized and filtered signal from the circuitry 92 is applied to a post amplifier 93 with AGC. The post amplifier 93 provides positive and negative thresholds $+V_T$ and $-V_T$ to respective comparators 94 and 95. The post amplifier 93 also provides the post amplified readback signal to the comparators 94 and 95. The comparators 94 and 95 comprise conventional peak detectors for detecting the positive and negative peaks of the readback pulses. The threshold detected waveform is illustrated on line E of FIG. 15.

The AGC of the post amplifier 93 provides automatic adjustment of the thresholds with respect to the retrieved signal which varies from track to track. The AGC circuitry defines the stabilized average signal in a conventional manner and sets the required threshold voltages for peak detection. Conventionally $\pm V_T$ is set between one-third to two-thirds the peak magnitude.

The outputs of the comparators 94 and 95 are applied to triggerable one shots 96 and 97, respectively, to narrow the pulse width since the required information is conveyed on the rising edges of the pulses. The outputs of the one-shots 96 and 97 are denoted as the positive pulse signal and the negative pulse signal respectively and are illustrated on lines F and G of FIG. 15. The positive and negative pulse signals from the one shots 96 and 97 are combined in a NOR gate 98 which forms a string of pulse pairs to toggle a triggerable flip-flop 99. The flip-flop 99 is initialized to its reset state by an initializing signal. The Q output of the flip-flop 99 is denoted as the retrieved data signal which indicates the presence of the CRA breaks. The retrieved data signal from the flip flop 99 is illustrated on line H of FIG. 15. The leading edges of the pulses from the NOR gate 98 trigger the flip-flop 99.

Thus it is appreciated from lines F, G, and H of FIG. 15 that for a positive polarity CRA breaks the positive pulse from the one shot 96 overlaps the retrieved data pulse from the flip-flop 99 whereas the negative pulse from the one shot 97 does not overlap the retrieved data pulse from the flip-flop 99. Conversely, for a negative polarity CRA breaks, the negative pulse from the one shot 97 overlaps the retrieved data pulse from the flip-flop 99 whereas the positive pulse from the one shot 96 does not overlap the retrieved data pulse from the flip-flop 99. This relationship will be utilized in a manner to be described to determine the polarity of the CRA breaks.

The retrieved data pulses from the flip-flop 99 are narrowed by a one shot 100 and shifted by a delay 101 to permit the leading edges of the narrowed and shifted retrieved data pulses to coincide with the midpoints of the CRA breaks. The narrowed and shifted retrieved data signal is illustrated on line I of FIG. 15. The shifted retrieved data is provided to a conventional phase locked loop 102 to generate a continuous stable read clock at a scaled up frequency. The read clock is denoted as $f_R$ and is illustrated on line J of FIG. 15.

Specifically, in accordance with phase locked loop design, the shifted retrieved data is applied as an input to a phase detector 103. The output of the phase detector 103 controls a voltage controlled oscillator 104 which provides the read clock $f_R$. Since $f_R$ is at twice the fundamental frequency of the shifted retrieved data pulse train (FIG. 15, line I) the $f_R$ signal is fed back to the phase detector 103 via a divide by two circuit 105. The feedback pulses from the divide by two circuit 105 is applied to an AND gate 106 that is enabled by the retrieved data pulses from the flip-flop 99. Thus the phase detector 103 always compares two strings of pulses which are simultaneously both present.

The phase locked read clock $f_R$, positioned near the readback break center, is utilized as the system reference clock for subsequent data recovery. Accordingly, $f_R$ is applied to a clock generation block 107 which provides read system clocks $f_{\overline{R}}$, $F_{NRZ}$, $F_{R/4}$ and $F_{\overline{NRZ}}$. The read system clocks are derived in a manner similar to that described above with respect to the write system. The clock $f_{\overline{R}}$ is derived by passing the read clock $f_R$ through an inverter. The clock $f_{R/4}$ is derived by passing $f_R$ through a divide by four circuit. The $f_{NRZ}$ clock is a clock synchronized with $f_R$ but having a clock rate of three/quarters that of $f_R$. The NRZ read clock $f_{\overline{NRZ}}$ is derived by passing $f_{NRZ}$ through an inverter. The relationships between the read clocks are readily appreciated from FIG. 15, lines J, N. O and Q.

The retrieved data signal from the flip-flop 99 indicates the detected presence of the CRA breaks and the phase locked loop 102 provides the data derived read clock $f_R$. The polarity information associated with the breaks is derived in the following manner. As discussed above, the negative pulse on the line G of FIG. 15 overlaps the retrieved data pulse on the line H of FIG. 15 only for negative going CRA breaks. For positive going CRA breaks, the negative pulse on the line G of FIG. 15 does not overlap the retrieved data pulse on the line H of FIG. 15. The retrieved data signal from the flip-flop 99 is applied as an input to an AND gate 108 and the negative pulse signal from the one shot 97 is applied through an inverting input of the AND gate 108. Thus the AND gate 108 only provides a pulse output when the retrieved data pulse resulted from a negative CRA break. The output of the AND gate 108 is shaped by a one shot 109 and applied to the D input of a D flip-flop 110. The D flip-flop 110 is clocked by the phase locked read clock $f_R$. The $\overline{Q}$ output of the flip-flop 110 provides the required polarity information and is designated as the polarity detect signal. The polarity detect signal is illustrated on line K of FIG. 15. The flip-flop 110 is clocked to remain in the $\overline{Q}$ state except at the occurrences of negative going CRA breaks at which time the flip-flop 110 is clocked to the Q state. Thus for positive CRA breaks, $\overline{Q}$ of the flip-flop 110 is high and for negative going CRA breaks the $\overline{Q}$ output of the flip-flop 110 is low. Since the flip-flop 110 is clocked by $f_R$, the polarity detect signal is synchronized to the $f_R$ clock.

The retrieved data signal from the flip-flop 99 is applied to a D type flip-flop 111 to synchronize the retrieved data signal to the $f_R$ clock. Accordingly, the retrieved data signal is applied to the D input of the flip-flop 111 which receives the $f_R$ signal at its clock input. The Q output of the flip-flop 111 provides the desired synchronized signal and is denoted as the data detect signal. The data detect signal is illustrated on line L of FIG. 15.

Conceptually the polarity detect signal on line K of FIG. 15 and the data detect signal on line L of FIG. 15 convey the desired CRA recovered data agreeing with the original CRA write waveform. The conceptual information conveyed is illustrated on line M of FIG. 15.

The polarity detect signal from the flip-flop 110 and the data detect signal from the flip-flop 111 are applied as inputs to four stage shift registers 112 and 113 respectively. The shift registers 112 and 113 are clocked by the $f_{\overline{R}}$ signal. As appreciated from FIG. 15, four $f_R$ clock pulses occur during each CRA cell defining the rising and falling edges of the polarity detect signal and the data detect signal. Thus after every four clock pulses the data presence data and polarity data associated with the two CRA breaks of a CRA cell are aligned with the second and fourth stages of the shift registers 112 and 113. The polarity data associated with the first and second CRA breaks of a CRA cell are denoted as $P_a$ and $P_b$, respectively while the break presence information for the first and second CRA breaks is denoted as $B_a$ and $B_b$, respectively. In order to retrieve the binary data associated with the CRA data the appropriate $P_a$ and $P_b$ data from the shift register 112 is transferred in parallel to a two stage polarity detect parallel buffer 114. The appropriate data detect signals are similarly transferred in parallel to a data detect parallel buffer 115. The appropriate polarity detect and data detect bits are strobed in parallel into the buffers 114 and 115 by the $f_{R/4}$ clock.

It is appreciated that the $P_a$, $P_b$, $B_a$ and $B_b$ signals strobed into the registers 114 and 115 contain all of the information required to remap the CRA digits into the original NRZ data. Accordingly, the polarity information from the buffer 114 and the data detect information from the buffer 115 are applied to binary data recovery logic 116 which remaps the CRA information into binary. The logic 116 may be implemented in accordance with the table of FIG. 17 by, for example, conventional combinational logic or ROM table lookup. In response to the $P_a$, $B_a$, $P_b$ and $B_b$ signals, the logic 116 provides in parallel the corresponding binary digits $D_0$, $D_1$ and $D_2$. The binary digits from the logic 116 are loaded in parallel into a three stage shift register 117 and shifted out by the clock $f_{NRZ}$.

It is appreciated from lines N and O of FIG. 15 that the $f_{R/4}$ clock that strobes the parallel buffers 114 and 115 occurs synchronously with the $f_{NRZ}$ clock. Specifically $f_{R/4} = 3 f_{NRZ}$. Thus $f_{R/4}$ strobes all of the break and polarity data required to define a CRA cell into the parallel buffers 114 and 115 which data, through the conversion logic 116 applies the three appropriate NRZ bits in parallel into the register 117. The next three occurring $f_{NRZ}$ pulses shift the NRZ data serially out of the register 117. The NRZ read data may be strobed by the NRZ read clock $f_{\overline{NRZ}}$. The NRZ read data associated with the example given in FIG. 15 is illustrated on line P of FIG. 15. The NRZ read clock $f_{\overline{NRZ}}$ is illustrated on line Q of FIG. 15.

Because of the well behaved waveshape of the readback pulses, the parameters for the readback system may be chosen to optimize performance. Additionally, pattern recognition circuits to correlate the readback pulse pair in amplitude and duration may be utilized to protect against drop in/drop out anomolies or random noise injection. Because of the symmetrical nature of the readout pulse pair, the read signal possesses a zero d.c. signal spectrum and minimizes external field disturbances. Since the playback signal is always a pulse pair exhibiting constant magnitude and predictable pattern independent transition positions, the critical complex signal processing requirements necessitated in existing magnetic recording systems are substantially reduced. The positive and negative readback pulse pair results in zero d.c. The cumulative d.c. wander problem prevalent in prior art systems is therefore obviated. The side fringing field penetration, troublesome in existing systems, is minimized because of the a.c. erasure feature of the present invention. This, in combination with the canceling effect of the readback pulse pair, permits the present invention to be utilized with reduced intertrack guard bands and at higher track densities than prior systems.

The a.c. dithering rate utilized for $f_R$ can vary over a wide frequency range without a significant effect on the state of the magnetic medium. The a.c. dither provides efficacious overwrite without an excessive signal to noise ratio penalty. New data is always recorded on a homogeneously erased medium providing minimum surface noise. Since the readback spectrum does not contain d.c. or low frequency components and the recording waveform requires a high frequency capability, the system of the present invention is eminently suited to thin film heads having wide recording bandwidth but limited low frequency playback response. Because of the timing stability of the readback waveform and because of the mapping that provides at least one pulse in each CRA cell, the present invention provides significantly enhanced clock recovery stability compared to the present day run length limited code technique.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A magnetic recording and reproducing system for recording information on a magnetic medium and recovering said information therefrom, comprising
    means for generating an alternating signal of alternating reversals that erases the medium,
    means for interrupting said alternating signal at a controlled first polarity thereof,
    means for continuing the generation of said alternating signal after said interruption at a polarity of said alternating signal opposite said first polarity,
    means for recording the interrupted alternating signal on said medium,
    said interruption comprising a break of said polarity embedded in said alternating signal,
    said means for generating an alternating signal including means for controlling the phase of said alternating signal in accordance with the polarities of said breaks,
    means for receiving input binary digits,
    mapping means responsive to groups of a predetermined number of said binary digits for controlling the generation of a predetermined number of said breaks, each break being present or absent and being of a polarity in accordance with said groups of binary digits,
    a system write clock in which said mapping means includes break generator means for generating said breaks in synchronism with said system write clock, and
    a break select signal generator included in said mapping means responsive to said groups of binary input digits for generating a break select signal for gating said breaks from said break generator means in accordance with said groups of binary input digits.

2. The system of claim 1 in which said mapping means includes a polarity select signal generator responsive to said groups of binary input digits for generating a polarity select signal for selectively inverting the polarity of said breaks in accordance with said groups of binary input digits.

3. The system of claim 2 in which said interrupted alternating signal comprises a CRA write signal with said breaks embedded therein, said system further including CRA write signal generation means comprising
- summing means for summing said breaks with said phase controlled alternating signal, and
- limiter means responsive to said summing means for clipping the output of said summing means thereby providing said alternating frequency signal with said breaks embedded therein.

4. The system of claim 2 in which said means for generating said alternating signal comprises a coherent frequency generator responsive to said groups of binary input digits and to said system write clock for generating said alternating signal synchronously with respect to said system write clock and with rising and falling edges coherent in polarity with respect to said breaks.

5. The system of claim 4 in which said coherent frequency generator includes means for gating a plurality of clocks in accordance with said groups of binary input digits for effecting a gradual phase change in said alternating signal in accordance with the polarities required for said breaks.

6. The system of claim 5 in which said break generator means includes means for providing a break center signal at the center of said breaks, said system further including means for gating said break center signals with said break select signal, said coherent frequency generator being responsive to said gated break center signal for switching the phase of said alternating signal at the center of said breaks.

7. The system of claim 1 in which said mapping means comprises means for mapping groups of three binary input digits into CRA cells comprising two break positions, said breaks being present or absent and of said first polarity or a second polarity in accordance with said groups of three binary input digits.

8. The system of claim 7 in which said mapping means comprises means for mapping said groups of three binary digits into said CRA cells wherein each cell has at least one CRA break present.

9. The system of claim 1 in which each said break that is present has either a positive going leading edge and a negative going trailing edge or a negative going leading edge and a positive going trailing edge in accordance with said groups of binary input digits, said breaks having positive going leading edges comprising positive breaks and said breaks having negative going leading edges comprising negative breaks,
- said alternating signal with said positive and negative breaks embedded therein comprising a CRA write signal,
- reading means responsive to said CRA write signal recorded on said medium for providing a read signal comprising a positive pulse followed by a negative pulse when reading a positive break, a negative pulse followed by a positive pulse when reading a negative break and a zero level signal when reading said alternating signal,
- peak detecting means for detecting said positive and negative pulses of said read signal, and
- means responsive to said peak detecting means for determining the presence of said breaks and the polarities thereof from said detected positive and negative pulses of said read signal, thereby providing a break presence signal and a break polarity signal respectively.

10. The system of claim 9 further including read clock generation means responsive to the positive and negative pulses of said read signal for generating a read clock signal phase locked thereto.

11. The system of claim 9 further including remapping means responsive to said break presence signal and said break polarity signal for providing binary digits corresponding thereto, thereby recovering the binary data corresponding to said breaks.

* * * * *